(12) United States Patent
Prasad et al.

(10) Patent No.: US 8,974,049 B2
(45) Date of Patent: Mar. 10, 2015

(54) FIXER COMPOSITION

(71) Applicant: Hewlett-Packard Development Company, L.P., Fort Collins, CO (US)

(72) Inventors: Keshava A. Prasad, San Marcos, CA (US); Fereshteh Khorrami, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 120 days.

(21) Appl. No.: 13/754,583

(22) Filed: Jan. 30, 2013

(65) Prior Publication Data

US 2013/0141500 A1 Jun. 6, 2013

Related U.S. Application Data

(63) Continuation-in-part of application No. PCT/US2011/057665, filed on Oct. 25, 2011.

(51) Int. Cl.
| | |
|---|---|
| *B41J 2/175* | (2006.01) |
| *C09D 5/00* | (2006.01) |
| *C09D 11/00* | (2014.01) |
| *B41J 2/21* | (2006.01) |
| *C09D 11/54* | (2014.01) |

(52) U.S. Cl.
CPC ............... *C09D 5/00* (2013.01); *B41J 2/17503* (2013.01); *C09D 11/005* (2013.01); *B41J 2/2114* (2013.01); *C09D 11/54* (2013.01)
USPC .................. 347/100; 347/95; 347/96; 347/98

(58) Field of Classification Search
CPC .............. B41J 2/01; B41J 2/21; B41J 2/2107; B41J 2/2117; B41J 2/17503; B41J 11/0015; B41J 11/54; B41J 2/2114; C09D 11/02; C09D 11/30; C09D 11/38; C09D 11/40; C09D 5/00; C09D 11/005; C09D 11/54
USPC ........ 347/21, 28, 95–100, 102; 523/160, 161; 106/31.13, 31.27, 31.6
See application file for complete search history.

(56) References Cited

U.S. PATENT DOCUMENTS

| | | | |
|---|---|---|---|
| 5,416,145 A | 5/1995 | Askeland et al. | |
| 6,908,185 B2 * | 6/2005 | Chen et al. | ........................ 347/96 |
| 7,303,616 B2 * | 12/2007 | Oki et al. | .................... 106/31.49 |
| 7,393,397 B2 | 7/2008 | Ham | |
| 8,182,597 B2 | 5/2012 | Robertson et al. | |
| 2003/0101904 A1 | 6/2003 | Morris et al. | |
| 2005/0142306 A1 * | 6/2005 | Uhlir-Tsang et al. | ....... 428/32.34 |
| 2006/0233976 A1 * | 10/2006 | Uhlir-Tsang et al. | ....... 428/32.34 |
| 2008/0043079 A1 | 2/2008 | Ikeda et al. | |
| 2012/0176443 A1 | 7/2012 | Robertson et al. | |
| 2012/0249623 A1 | 10/2012 | Vasudevan et al. | |

FOREIGN PATENT DOCUMENTS

WO WO 2011099977 A1 * 8/2011

OTHER PUBLICATIONS

HP2200 Ink-jet Printer, No Date.*

* cited by examiner

*Primary Examiner* — Matthew Luu
*Assistant Examiner* — Rut Patel
(74) *Attorney, Agent, or Firm* — Dierker & Associates, P.C.

(57) ABSTRACT

A fixer composition is disclosed herein. An example of the fixer composition includes from about 5 wt % to about 25 wt % of a co-solvent, from about 1 wt % to about 20 wt % of a calcium salt, from about 0.01 wt % to about 0.6 wt % of a sulfonated chelating agent, and a balance of water.

20 Claims, 2 Drawing Sheets

FIXER COMPOSITION

CROSS-REFERENCE TO RELATED APPLICATIONS

This application is a continuation-in-part of International Application No. PCT/US11/57665, entitled "An Ink Composition", filed on Oct. 25, 2011, which PCT application designated the United States.

BACKGROUND

Inkjet printing or recording systems are commonly used as an effective way to produce images on a print medium, such as paper. Generally, ink droplets are ejected from a nozzle at high speed by the inkjet recording system and onto the print medium to produce an image thereon. Thermal inkjet printing involves passing a pulse of current through a heating element, which causes a rapid vaporization of ink in a chamber to form a bubble. This results in a large pressure increase, which propels a droplet of ink onto the print medium. During the firing of a drop, a layer of ink covering the surface of the heating element can reach high temperatures, e.g., about 340° C. At this temperature, the ink may decompose and deposit residue on the surface of the heating element. This process is known as kogation. Kogation may deleteriously affect the volume, shape, and/or velocity of the ejected drop, which may cause the quality of the printed output to vary.

BRIEF DESCRIPTION OF THE DRAWINGS

Features and advantages of examples of the present disclosure will become apparent by reference to the following detailed description and drawings, in which.

DETAILED DESCRIPTION

Figure 1:
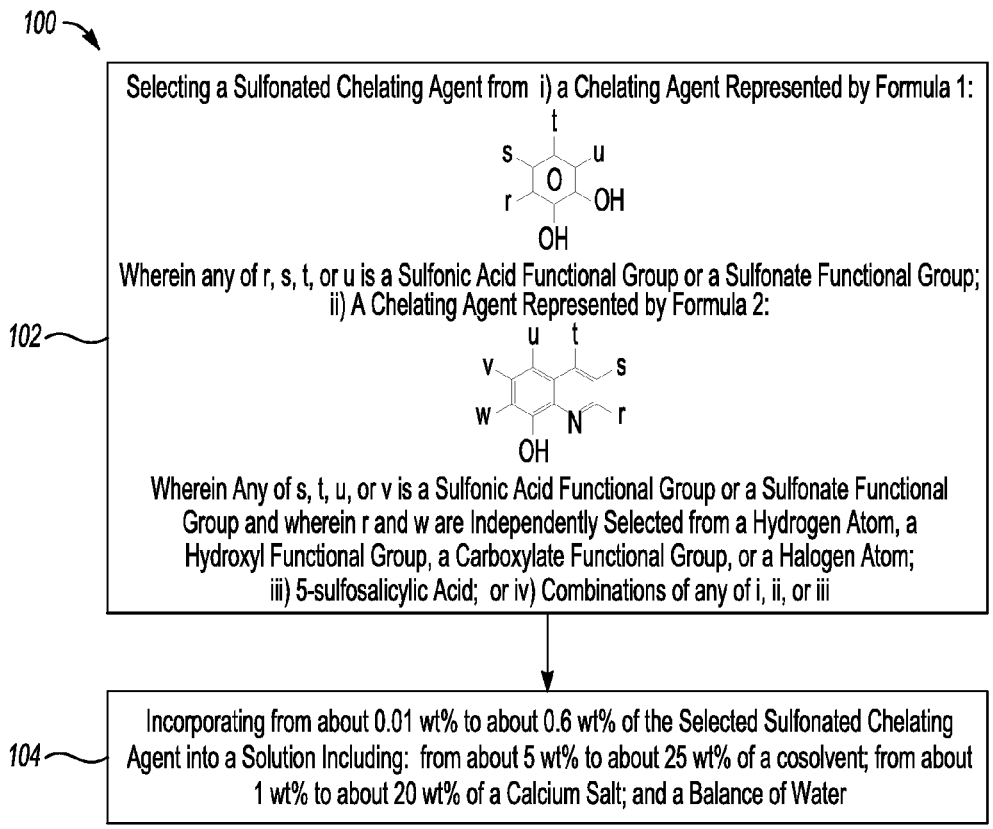
FIG. 1 is a flow diagram of an example of the method of the present disclosure.

Examples of the compositions disclosed herein include specific sulfonated chelating agent(s). In some examples, the composition may be formulated as a colorless fixer fluid that is to be printed on a medium prior to a colored ink. When used as a colorless fixer, examples of the composition disclosed herein crash the subsequently printed colorant on the media surface to maintain consistent and desirable print quality. As will be described hereinbelow, other examples of the composition may be formulated as a colored ink that is to be printed on a medium to form text, images, graphics, etc. thereon.

The addition of the specific sulfonated chelating agent(s) to the example fixer composition(s) advantageously helps the fixer composition(s) to resist decomposition over the useful life of the print cartridge(s) from which the composition(s) is/are dispensed. As such, examples of the fixer composition disclosed herein increase the print cartridge life, at least in part by slowing down or even preventing the rate of buildup of thermally decomposed (i.e., kogated) fixer components on the surface of the heating element. Depending upon the cartridge that is utilized, the useful life of the print cartridge may be up to, and in some instances higher than, 1 billion drops per nozzle.

The addition of the sulfonated chelating agent(s) to examples of the fixer composition does not deleteriously impact decap performance, and in some instances may improve decap performance. The term "decap," as referred to herein, means the ability of the fixer or ink composition to readily eject from the print head, upon prolonged exposure to air. The decap time is measured as the amount of time that a print head may be left uncapped before the printer nozzles no longer fire properly, potentially because of clogging or plugging. Nozzle(s) may become clogged/plugged by a viscous plug that forms in the nozzle(s) as a result of water loss, and/or crusting and/or crystallization of the fixer or ink component(s) in and/or around any of the nozzles. If a nozzle has plugged, fixer or ink droplets ejected through the nozzle's orifice may be misdirected, which may adversely affect print quality. The orifice may also become completely blocked, and as a result, the fixer or ink droplets may not pass through the affected nozzle. It is believed that the fixer and ink composition(s) disclosed herein including the sulfonated chelating agent(s) have comparable or improved decap performance when compared, for example, to fixer and ink compositions that do not include such sulfonated chelating agent(s).

When formulated as the colorless fixer fluid, examples of the composition disclosed herein include a co-solvent; a calcium salt; any of the sulfonated chelating agents disclosed herein; and a balance of water.

The co-solvent selected depends, at least in part, upon the other components in the fixer composition. Examples of co-solvents that are suitable for the fixer composition include di-(2-hydroxyethyl)-5,5-dimethylhydantoin; 2-hydroxyethyl-2-pyrrollidinone; 2-pyrrollidinone; glycerol polyoxyethyl ether; tripropylene glycol; triethylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof. In an example, the fixer composition includes tetraethylene glycol alone as the co-solvent.

In an example, the total amount of co-solvent(s) utilized in the fixer composition ranges from about 5 wt % to about 25 wt % of the total wt % of the composition. In an example of the fixer composition, the total amount of co-solvent(s) ranges from about 10 wt % to about 15 wt %.

The calcium salt may be present in the fixer composition in an amount ranging from about 1 wt % to about 20 wt %. In an example, the fixer composition includes from about 5 wt % to about 9 wt % of the calcium salt. The calcium salt is a fixing agent, which is used to immobilize colorant (e.g., present in a colored ink printed thereon). Examples of the calcium salt include calcium nitrate and/or calcium propionate (i.e., propionic acid, calcium salt).

The fixer composition also includes the sulfonated chelating agent. One example of the sulfonated chelating agent is a catechol. This chelating agent is represented by formula 1:

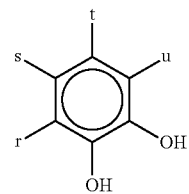

where r, s, t, and/or u is a sulfonic acid functional group or a sulfonate functional group. In other words, at least one of r, s, t, or u is $SO_3H$, or $SO_3^-$ in the presence of a metal cation.

Other groups suitable for r, s, t, and/or u include hydrogen atoms, hydroxyl functional groups, or carboxylate functional groups. An example of the chelating agent represented by formula 1 has r=H, s=SO₃H, t=H, and u=SO₃H, includes two sodium atoms and water, and is known as 4,5-dihydroxy-1,3-benzenedisulfonic acid, disodium salt or TIRON (available from TCI America, Portland, Oreg.).

Another example of the sulfonated chelating agent is represented by formula 2:

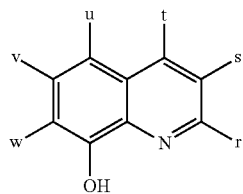

where s, t, u and/or v is a sulfonic acid functional group or a sulfonate functional group. In other words, at least one of s, t, u, or v is SO₃H, or SO₃⁻ in the presence of a metal cation. Groups suitable for r and w include hydrogen atoms, hydroxyl functional groups, carboxylate functional groups, or halogen atoms. When s, t, u, and/or v is not a sulfonic acid functional group or a sulfonate functional group, s, t, u, and/or v may be a hydrogen atom, a hydroxyl functional group, a carboxylate functional group, or a halogen atom. An example of the sulfonated chelating agent represented by formula 2 has r=H, s=H, t=H, u=SO₃H, v=H, and w=I, and is known as 8-hydroxy-7-iodo-5-quinolinesulfonic acid (commercially available as FERRON from Sigma-Aldrich).

Still another example of a suitable sulfonated chelating agent is 5-sulfosalicylic acid (SSA) (commercially available from Sigma-Aldrich).

The sulfonated chelating agents may be used alone or in any combination. The total amount of the sulfonated chelating agent(s) present in examples of the fixer composition ranges from about 0.01 wt % to about 0.6 wt %. In an example, the fixer composition includes from about 0.01 wt % to about 0.2 wt % of any one of the sulfonated chelating agents. In another example, the fixer composition includes from about 0.05 wt % to about 0.2 wt % of any one of the sulfonated chelating agents. As another example, the fixer composition includes a combination of sulfonated chelating agents including from about 0.01 wt % to about 0.2 wt % of 4,5-dihydroxy-1,3-benzenedisulfonic acid, disodium salt, from about 0.01 wt % to about 0.2 wt % of 8-hydroxy-7-iodo-5-quinolinesulfonic acid, and from about 0.01 wt % to about 0.2 wt % of 5-sulfosalicylic acid.

Further, in an example, the sulfonated chelating agent(s) are present in the composition without other (e.g., carboxylated) chelating agents. Chelating agents having only carboxylate groups are insoluble in calcium salts, and thus are not used in combination with the sulfonated chelating agents in the examples of the fixer composition disclosed herein.

As mentioned above, the selected sulfonated chelating agent(s) are believed to improve kogation without having a deleterious impact on decap performance, and at least in some instances, improve kogation while also improving decap performance.

When formulated as the fixer, the composition is colorless and thus specifically excludes a colorant. Moreover, when formulated as the fixer, in addition to the co-solvent(s), the chelating agent(s), and the water, the composition also includes methanesulfonic acid, a non-ionic surfactant, and/or a biocide.

In an example of the fixer composition disclosed herein, methanesulfonic acid may be used to adjust the pH of the composition to a target or desired pH. The amount utilized may vary depending upon the target/desired pH. In an example, the amount of methanesulfonic acid used ranges from about 0.5 wt % to about 4 wt %.

When a non-ionic surfactant is utilized in the fixer composition, a suitable amount of the non-ionic surfactant may range from about 0.3 wt % to about 2 wt %. Examples of suitable non-ionic surfactants include those based upon acetylenic diol chemistry (e.g., SURFYNOL® SE-F and SURFYNOL® 440, available from Air Products and Chemicals, Inc., Allentown, Pa.), fluorosurfactants, and secondary alcohol ethoxylates (e.g., TERGITOL™ 15-S-30, TERGITOL™ 15-S-7 and TERGITOL™ 15-S-9m available from The Dow Chemical Co., Midland, Mich.).

When a biocide is utilized in the fixer composition, a suitable amount of the biocide may range from about 0.05 wt % to about 0.6 wt %. If multiple biocides are utilized, the total amount is equal to or less than 0.6 wt %. The upper limit for any individual biocide may depend upon the type of biocide and its toxicological effect and/or regulatory requirements (e.g., the upper limit for PROXEL™ GXL is about 0.25 wt %). Suitable biocides for the fixer composition include, for example, PROXEL™ GXL, KORDEK™ MLX, and/or BIOBAN™ CS-1246.

The balance (up to 100 wt %) of the fixer composition is made up of water (e.g., deionized water).

For thermal inkjet printing pigmented ink, it may be desirable that the composition (whether formulated as the fixer composition or the colored ink composition described below) have a basic pH, ranging anywhere from greater than 7 to 12. When the initial pH of the resulting composition is acidic, neutral, or near-neutral basic (e.g., having a pH ranging from 7.1 to 8), it may be desirable to adjust the pH of the resulting composition to a basic or more basic pH. Any suitable base may be added to adjust the pH, as long as the added base does not interfere with the other desirable properties of the composition. Examples of suitable bases include NaOH or KOH. The amount of base added will depend, at least in part, on the initial pH of the composition and the desired final pH of the composition. In an example, the pH is adjusted to about 9, and a suitable amount of base is added until this pH is obtained. When adding the base to the composition, the pH may be tested in order to determine if the desired pH has been obtained.

In other examples, it may be desirable that the composition have an acidic pH (below 7). This may be particularly desirable when the composition is used as a fixer. The pH may be adjusted using any desirable acid, such as methanesulfonic acid (as mentioned above). When adding the acid to the composition, the pH may be tested in order to determine if the desired pH has been obtained. In an example, the pH ranges from about 5.8 to about 7.0. In another example, the pH is about 6.6. Examples of the fixer composition according to the present disclosure have a pH that is above 5 in order to avoid issues such as corrosion, etc. Fixer compositions at a pH of about 5.8 to about 7.0 are generally sensitive to contamination by metals such as chromium, iron, aluminum, etc. that are introduced as low level contaminants with the calcium salt. The present inventors have discovered that sulfonated chelating agents remain in solution in the presence of about 1 wt % to about 20 wt % calcium salts and the low level metal contaminants, while carboxylated chelating agents do not remain in solution.

An example of the fixer composition of the present disclosure includes about 6.5 wt % calcium propionate (propionic acid, calcium salt), about 12 wt % tetraethyleneglycol, about 0.3 wt % TERGITOL™ 15-S-30, about 0.14 wt % KORDEK™ MLX, about 0.24 wt % PROXEL™ GXL, about 0.12 wt % methanesulfonic acid, about 0.09 wt % TIRON (4,5-dihydroxy-1,3-benzenedisulfonic acid, disodium salt), about 0.1 wt % SSA (5-Sulfosalicylic acid), and the balance water. The pH is about 6.6.

Referring now to FIG. 1, a method 100 for improving kogation of a fixer composition according to an example of the present disclosure includes selecting a sulfonated chelating agent from the group consisting of i) a chelating agent represented by formula 1:

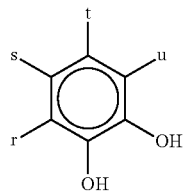

wherein any of r, s, t, or u is a sulfonic acid functional group or a sulfonate functional group; ii) a chelating agent represented by formula 2:

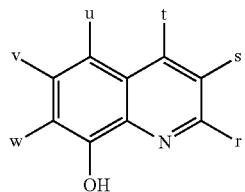

wherein any of s, t, u, or v is a sulfonic acid functional group or a sulfonate functional group and wherein r and w are independently selected from a hydrogen atom, a hydroxyl functional group, a carboxylate functional group, or a halogen atom; iii) 5-sulfosalicylic acid; or iv) combinations of any of i, ii, or iii, as shown at box 102.

The method 100 further includes incorporating from about 0.01 wt % to about 0.6 wt % of the selected sulfonated chelating agent into a solution including: from about 5 wt % to about 25 wt % of a co-solvent; from about 1 wt % to about 20 wt % of a calcium salt; and a balance of water, as shown at box 104.

As mentioned above, the sulfonated chelating agents may also be included in colored ink compositions to improve kogation performance, which may be evidenced by a reduction in the change in drop velocity and drop weight during printing. When formulated as the colored ink, in addition to the co-solvent(s), the sulfonated chelating agent(s), and the water, the composition also includes a colorant. Unlike the fixer composition(s) disclosed herein, the colored ink composition generally does not include the calcium salt.

Any of the previously listed co-solvents may be suitable for the colored ink composition. As examples, a magenta or yellow ink composition includes di-(2-hydroxyethyl)-5,5-dimethylhydantoin and 2-hydroxyethyl-2-pyrrollidinone as co-solvents; another magenta ink composition includes 2-pyrrollidinone, triethylene glycol, and di-(2-hydroxyethyl)-5,5-dimethylhydantoin as co-solvents; and another yellow ink composition includes tripropylene glycol and tetraethylene glycol as co-solvents. The total amount of co-solvent(s) utilized in the colored ink composition ranges from about 5 wt % to about 25 wt % of the total wt % of the composition. In an example of the colored ink composition, the total amount of co-solvent(s) ranges from about 9.5 wt % to about 22 wt %.

It is to be understood that the colored ink composition(s) may include any of the sulfonated chelating agent(s) in the amounts disclosed herein.

The colorant of the colored ink composition may include a water-soluble dye, a self-dispersed pigment, a pigment dispersed by polymeric dispersant(s), or a combination thereof. Some examples of suitable water-soluble dyes include acid dyes, direct dyes and copper phthalocyanine dyes. Some examples of self-dispersed pigment dispersions include the CAB-O-JET® 200, 300 and 400 series (from Cabot Corp., Boston, Mass.). For examples including pigments that are dispersed by polymeric dispersant(s), the polymeric dispersant contains a polymer with an acid number ranging from about 100 to about 250 and including a dispersing polymer with a weight average molecular weight ranging from about 5000 to about 20000. In an example, the pigment dispersion is a magenta pigment with a styrene acrylate dispersant, similar to, for example, PR 122, PR 282, PR 269 and PR150. In another example, the pigment dispersion contains a yellow pigment, such as PY 74, PY 155 and PY128, dispersed similarly to the previously mentioned magenta dispersions. Pigment dispersions of other colors, aside from magenta and yellow, are within the scope of the present disclosure as long as they have similar dispersing polymer(s). In an example, the amount of colorant utilized in the colored ink composition ranges from about 0.5 wt % to about 6 wt % of the total wt % of the colored ink composition. In another example, the amount of colorant utilized in the ink composition ranges from about 3 wt % to about 5 wt % of the total wt % of the colored ink composition.

Examples of the colored ink composition may also include a non-ionic surfactant and/or a biocide.

When a non-ionic surfactant is utilized in the colored ink composition, a suitable amount of the non-ionic surfactant may range from about 0.1 wt % to about 2 wt %. Examples of suitable non-ionic surfactants include those based upon acetylenic diol chemistry (e.g., SURFYNOL® SE-F and SURFYNOL® 440, available from Air Products and Chemicals, Inc., Allentown, Pa.), fluorosurfactants, dodecyl-2-pyrrolidone, and secondary alcohol ethoxylates (e.g., TERGITOL™ 15-S-7 and TERGITOL™ 15-S-9m available from The Dow Chemical Co., Midland, Mich.).

When a biocide is utilized in the colored ink composition, a suitable amount of the biocide may range from about 0.05 wt % to about 0.25 wt %. If multiple biocides are utilized, the total amount is equal to or less than 0.25 wt %. It is to be understood that the upper limit for the individual biocide may depend upon the type of biocide and its toxicological effect and/or regulatory requirements. For example, the upper limit for PROXEL™ GXL (Arch Chemicals, Inc., Norwalk, Conn.) is about 0.25 wt %. Suitable biocides include, for example, PROXEL™ GXL, KORDEK™ MLX (Dow Chemical Co., Midland, Mich.), and/or BIOBAN™ CS-1246 (Dow Chemical Co.).

Examples of the colored ink composition disclosed herein may also include, in some instances, other additives, such as a polyurethane binder, ethoxylated glycerol and/or an alkyl phosphate ester.

When a polyurethane binder is utilized, a suitable amount of the binder may be up to about 3 wt %. In the examples disclosed herein, the polyurethane binder has an acid number ranging from 20 to 59, and a weight average molecular weight ranging from about 20000 to about 50000. In an example, the polyurethane binder has an acid number of 55 and a weight average molecular weight of about 42000. It is to be understood that the co-solvent(s) used and the amount of co-solvent(s) used may depend, at least in part, upon whether the polyurethane binder is included in the colored ink composition. As an example, the co-solvent may be selected in order to aid in dispersing the polyurethane binder throughout the colored ink composition. As another example, the amount of polyurethane binder used may have a deleterious effect on the decap performance, and the co-solvent(s) may be selected to counteract this deleterious effect. In some examples that include the polyurethane binder, two co-solvents may be used, such as di-(2-hydroxyethyl)-5,5-dimethylhydantoin and 2-hydroxyethyl-2-pyrrollidinone, or tetraethylene glycol and tripropylene glycol. In some other examples that include the polyurethane binder, three co-solvents may be used, such as di-(2-hydroxyethyl)-5,5-dimethylhydantoin, 2-pyrrollidinone and triethylene glycol.

In the colored ink compositions disclosed herein, the selected sulfonated chelating agent(s) may be used in combination with or in place of ethoxylated glycerol (e.g., LIPONIC™ EG-1, Lipo Chemicals, Inc., Paterson, N.J.). It is believed that ethoxylated glycerol alone may not be as effective in preventing kogation when compared to the example colored ink compositions disclosed herein. The ethoxylated glycerol may be present in examples of the colored ink composition in an amount up to about 1 wt %.

Examples of the colored ink composition disclosed herein may also include an alkyl phosphate ester, which is believed to contribute to the reduction or elimination of kogation. This component may be present in the colored ink composition in an amount up to about 1 wt % of the total wt % of the ink composition. Some examples of suitable alkyl phosphate esters include those that are commercially available from Croda, Inc., Edison, N.J., such as CRODAFOS™ O3A (formerly the CRODAFOS™ N3 product series, including the acid form) or CRODAFOS™ O3A-LQ-(MH).

Figure 2:
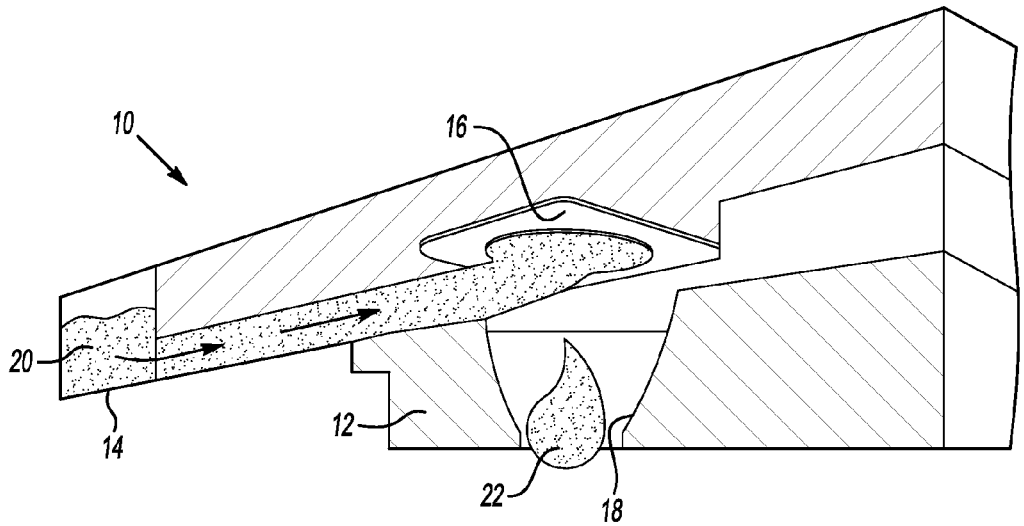
FIG. 2 is a cut-away, perspective semi-schematic illustration of an example of an ink cartridge including an example of the composition disclosed herein.

The fixer composition(s) and colored ink composition(s) disclosed herein may be suitable for use in various printing processes, including high speed printing processes. In an example, the fixer and/or colored ink composition(s) may be used in web press printers that print more than 1 meter per second. A cut-away, perspective semi-schematic view of an example of a print cartridge 10 that may be used, e.g., in a web press printer is shown in FIG. 2. The print cartridge 10 includes a housing 12 (which may include one or more layers of different materials) that is operatively connected to a reservoir 14 that contains an example of the composition 20 disclosed herein. A fluid path connects the reservoir 14 to a fluid ejector 16. In a thermal inkjet print cartridge 10, the fluid ejector 16 is a heating element that creates heat to vaporize the composition 20, which creates a bubble that expands to push the composition 20 (in the form of drops 22) out of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing drops 22 therefrom to produce a layer of fixer and/or images on a desirable medium.

When used with high speed printers, the fixer and/or colored ink composition(s) disclosed herein provide substantially consistent print quality (i.e., ≤20% change in drop velocity and drop weight, and in some instances ≤10% change in drop velocity and drop weight) over the life of the print cartridge 10. The composition(s) disclosed herein may also maintain suitable decap performance in high speed printers, where the number of spits per nozzle at a given frequency maintains nozzle health of idle nozzles during printing.

To further illustrate the present disclosure, examples are given herein. It is to be understood that these examples are provided for illustrative purposes and are not to be construed as limiting the scope of the disclosed example(s).

EXAMPLES

In the examples disclosed herein, to obtain consistent print quality over the life of the pen/cartridge, it is desirable to have a % change in drop velocity and a % change in drop weight each be equal to or less than 10% (in either the positive or negative direction). A % change in drop velocity and a % change in drop weight that are each between 10% and 20% are less desirable, but may still result in consistent print quality. An ink composition or fixer composition that results in a % change in drop velocity and/or a % change in drop weight that is over 20% is deemed undesirable (even if the other % change is less than 20%).

Twenty samples (1-20) were prepared according to Table 1 below and FIG. 3, as well as a control (C) that was prepared according to Table 1 but did not include any sulfonated chelating agents.

Samples 1-20 and the control (C) sample each contained calcium propionate, tetraethyleneglycol, TERGITOL™ 15-S-30, KORDEK™ MLX, PROXEL™ GXL and methanesulfonic acid in respective weight percents within the ranges shown in Table 1. The types and amounts of sulfonated chelating agent(s) present in samples 1-20 is shown in FIG. 3. For example, sample 15 contained 0.05 wt % Tiron, 0.2 wt % SSA, and 0.05 wt % Ferron.

TABLE 1

Fixer Ink Composition Formulations

| Chemical | CAS# | Range |
|---|---|---|
| Calcium Propionate (Propionic acid, calcium salt) | 4075-81-4 | 5.0-7.0 |
| Tetraethyleneglycol | 112-60-7 | 10.0-15.0 |
| Tergitol 15-S-30 | 68131-40-8 | 0.1-0.5 |
| Kordek MLX | | 0.05-0.25 |
| Proxel GXL | | 0.05-0.25 |
| Methanesulfonic acid (to titrate to target pH) | 75-75-2 | 0.05-0.5 |
| Tiron: 4,5-dihydroxy-1,3-benzenedisulfonic acid, disodium salt | 149-45-1 | 0.01-0.3 |
| Ferron: 8-Hydroxy-7-iodo-5-quinolinesulfonic acid | 547-91-1 | 0.01-0.03 |
| SSA: 5-Sulfosalicylic acid | 97-05-2 | 0.01-0.3 |
| DI-Water | | Balance |
| pH | | 5.8-7.0 |

Each of the comparative fixer sample and fixer samples 1-20 were filled into a thermal inkjet pen/cartridge (Hewlett-Packard HP38 pens), and were continuously fired on a pen/cartridge life test apparatus for the life of the pen/cartridge.

For this test, no media was used. Rather, the pen/cartridge life test apparatus exercised the pen/cartridge, and the fixer drops were ejected into a spittoon. At certain intervals and at the end of the pen/cartridge life (up to 1 billion drops per nozzle), the pen/cartridge drop velocity and drop weight were monitored. FIG. 3 illustrates the % change in drop velocity and % change in drop weight at the end of 1 billion drops.

Fixer samples 12-20 each exhibited a desirable equal to or less than 20% change in drop velocity and in drop weight. The same data collected for the comparative fixer sample indicated that the comparative sample was poor (sample C exhibited a % change in drop velocity of 58 and % change in drop weight of 36).

Samples 12, 19 and 20 each exhibited % changes in drop velocity and drop weight of 11 or less. Sample 12 (% change in drop velocity of 9 and % change in drop weight of 6) included 0.05 wt % Tiron, no SSA and 0.05 wt % Ferron. Sample 19 (% change in drop velocity of 6 and % change in drop weight of 5) included 0.15 wt % Tiron, no SSA and no Ferron. Sample 20 (% change in drop velocity of 10 and % change in drop weight of 11) included 0.2 wt % Tiron, no SSA and no Ferron.

Figure 3:
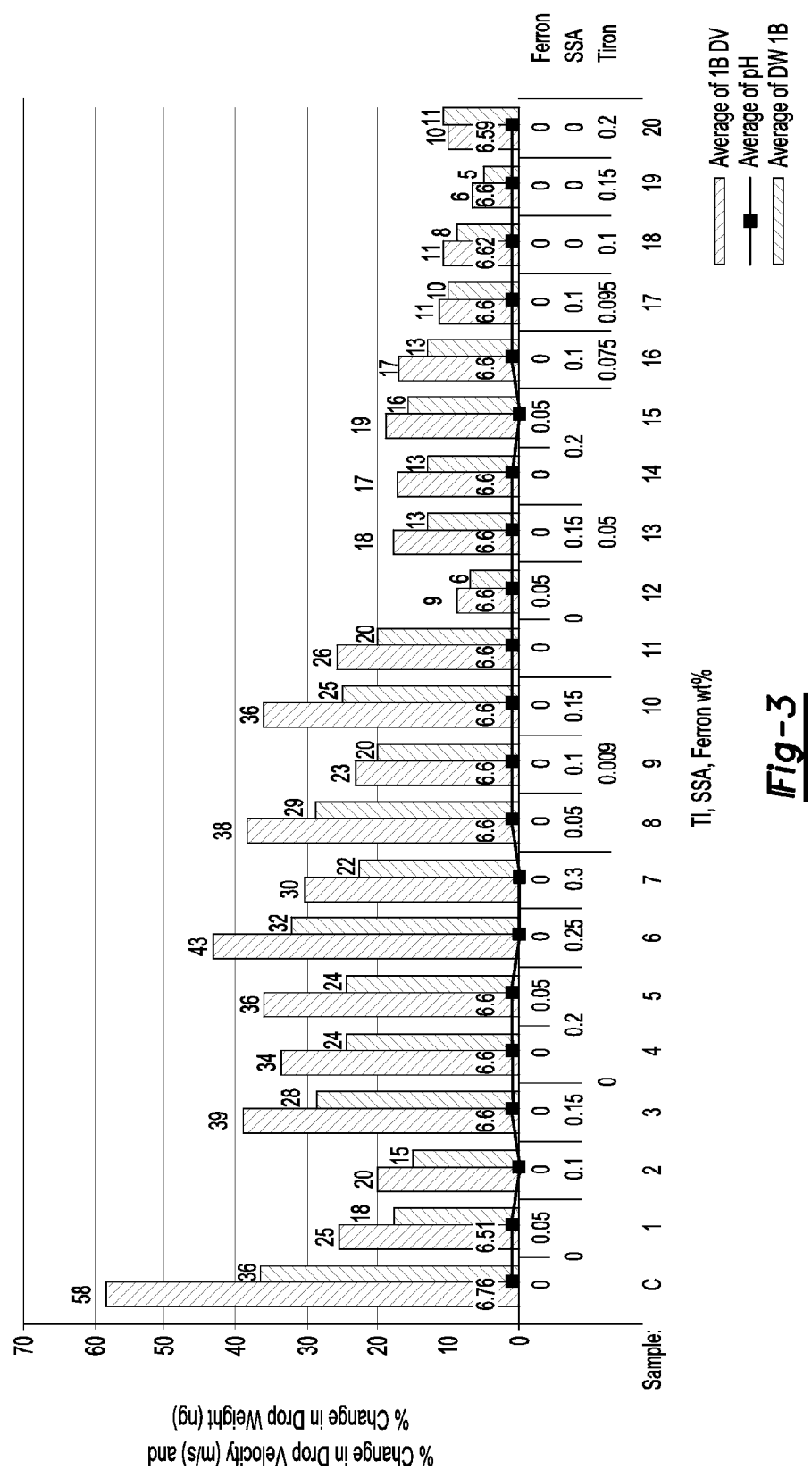
FIG. 3 is a graph illustrating % change in drop velocity versus amounts and types of sulfonated chelating agent(s).

Overall, the data from FIG. 3 illustrates that a chelating agent(s) including sulfonate functional groups is suitable for reducing kogation of fixer ink compositions over the life of the pen/cartridge, and is more effective than a similar comparative fixer composition that does not include the sulfonated chelating agent(s).

It is to be understood that the ranges provided herein include the stated range and any value or sub-range within the stated range. For example, a range from about 5 wt % to about 25 wt % should be interpreted to include not only the explicitly recited limits of about 5 wt % to about 25 wt %, but also to include individual values, such as 9.5 wt %, 15 wt %, 21.6 wt %, etc., and sub-ranges, such as from about 9.5 wt % to about 15 wt %, from about 10 wt % to about 22 wt %, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A fixer composition, comprising:
    from about 5 wt % to about 25 wt % of a co-solvent;
    from about 1 wt % to about 20 wt % of a calcium salt;
    from about 0.01 wt % to about 0.6 wt % of a sulfonated chelating agent,
    wherein the sulfonated chelating agent is represented by a formula:

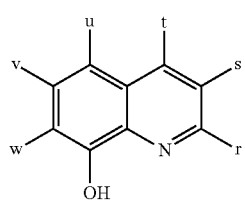

wherein any of s, t, u, or v is a sulfonic acid functional group or a sulfonate functional group and wherein r and w are independently selected from a hydrogen atom, a hydroxyl functional group, a carboxylate functional group, or a halogen atom; and
    a balance of water.

2. The fixer composition as defined in claim 1, further comprising an additional sulfonated chelating agent:
    i) represented by formula 1:

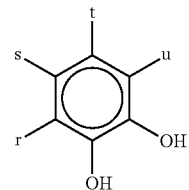

wherein any of r, s, t, or u is a sulfonic acid functional group or a sulfonate functional group;
    ii) 5-sulfosalicylic acid; or
    iii) combinations of any of i or ii.

3. The fixer composition as defined in claim 2 wherein the additional sulfonated chelating agent includes from about 0.01 wt % to about 0.2 wt % of 4,5-dihydroxy-1,3-benzenedisulfonic acid, disodium salt, and from about 0.01 wt % to about 0.2 wt % of 5-sulfosalicylic acid, and wherein the sulfonated chelating agent includes from about 0.01 wt % to about 0.2 wt % of 8-hydroxy-7-iodo-5-quinolinesulfonic acid.

4. The fixer composition as defined in claim 1 wherein the fixer composition excludes a colorant.

5. The fixer composition as defined in claim 4, further comprising:
    from about 0.05 wt % to about 0.6 wt % of a biocide;
    from about 0.1 wt % to about 0.5 wt % of a non-ionic surfactant; and
    from about 0.5 wt % to about 4 wt % of methanesulfonic acid.

6. The fixer composition as defined in claim 1 wherein the co-solvent includes di-(2-hydroxyethyl)-5,5-dimethylhydantoin; 2-hydroxyethyl-2-pyrrollidinone; 2-pyrrollidinone; triethylene glycol; glycerol polyoxyethyl ether; tripropylene glycol; tetraethylene glycol; 1-(2-hydroxyethyl)-2-imidazolidinone; 1,2,6-hexanetriol; trimethylolpropane; glycerol; 2-hydroxyethyl-2-methyl-1,3-propanediol; or combinations thereof.

7. The fixer composition as defined in claim 1 wherein a pH of the fixer composition ranges from 5.8 to 7.

8. The fixer composition as defined in claim 1 wherein the calcium salt is calcium nitrate or calcium propionate.

9. The fixer composition as defined in claim 1 wherein a pH of the fixer composition ranges from 7 to 12.

10. A fixer composition, comprising:
    from about 5 wt % to about 25 wt % of a co-solvent;
    from about 1 wt % to about 20 wt % of a calcium salt;
    from about 0.01 wt % to about 0.6 wt % of a sulfonated chelating agent; and
    a balance of water;
    wherein the sulfonated chelating agent is 4,5-dihydroxy-1,3-benzenedisulfonic acid, disodium salt.

11. A fixer composition, comprising:
    from about 5 wt % to about 25 wt % of a co-solvent;
    from about 1 wt % to about 20 wt % of a calcium salt;

from about 0.01 wt % to about 0.6 wt % of a sulfonated chelating agent; and a balance of water;

wherein the sulfonated chelating agent is 8-hydroxy-7-iodo-5-quinolinesulfonic acid.

12. A cartridge, comprising:

a fluid reservoir;

a fluid ejector in fluid communication with the fluid reservoir; and the fixer composition as defined in claim 1 present in the fluid reservoir.

13. The cartridge as defined in claim 12, further comprising an additional sulfonated chelating agent:

i) represented by formula 1:

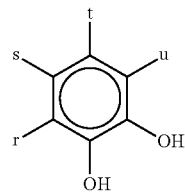

wherein any of r, s, t, or u is a sulfonic acid functional group or a sulfonate functional group;

ii) 5-sulfosalicylic acid; or iii) combinations of any of i or ii.

14. The cartridge as defined in claim 13 wherein the additional sulfonated chelating agent represented by formula 1 is 4,5-dihydroxy-1,3-benzenedisulfonic acid, disodium salt.

15. The fixer composition as defined in claim 13 wherein the sulfonated chelating agent represented by the formula is 8-hydroxy-7-iodo-5-quinolinesulfonic acid.

16. The cartridge as defined in claim 13 wherein the additional sulfonated chelating agent includes from about 0.01 wt % to about 0.2 wt % of 4,5-dihydroxy-1,3-benzenedisulfonic acid, disodium salt, and from about 0.01 wt % to about 0.2 wt % of 5-sulfosalicylic acid, and wherein the sulfonated chelating agent includes from about 0.01 wt % to about 0.2 wt % of 8-hydroxy-7-iodo-5-quinolinesulfonic acid.

17. The cartridge as defined in claim 13 wherein:

the fixer composition excludes a colorant;

the calcium salt is calcium nitrate or calcium propionate;

the additional sulfonated chelating agent includes from about 0.01 wt % to about 0.2 wt % of 4,5-dihydroxy-1,3-benzenedisulfonic acid, disodium salt, and from about 0.01 wt % to about 0.2 wt % of 5-sulfosalicylic acid, and wherein the sulfonated chelating agent includes from about 0.01 wt % to about 0.2 wt % of 8-hydroxy-7-iodo-5-quinolinesulfonic acid;

the co-solvent is tetraethylene glycol; and the fixer composition further includes:

from about 0.05 wt % to about 0.6 wt % of a biocide;

from about 0.3 wt % to about 2 wt % of a non-ionic surfactant; and from about 0.5 wt % to about 4 wt % of methanesulfonic acid.

18. A method for improving kogation of a fixer composition, the method comprising:

selecting a sulfonated chelating agent, wherein the sulfonated chelating agent is represented by a formula:

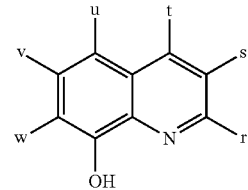

wherein any of s, t, u, or v is a sulfonic acid functional group or a sulfonate functional group and wherein r and w are independently selected from a hydrogen atom, a hydroxyl functional group, a carboxylate functional group, or a halogen atom; and incorporating from about 0.01 wt % to about 0.6 wt % of the selected sulfonated chelating agent into a solution including:

from about 5 wt % to about 25 wt % of a co-solvent;

from about 1 wt % to about 20 wt % of a calcium salt; and a balance of water.

19. The method of claim 18, further comprising selecting an additional sulfonated chelating agent selected from the group consisting of:

i) a sulfonated chelating agent represented by formula 1:

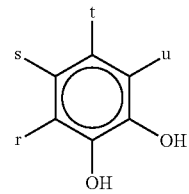

wherein any of r, s, t, or u is a sulfonic acid functional group or a sulfonate functional group;

ii) 5-sulfosalicylic acid; or iii) combinations of any of i or ii;

wherein the incorporating includes the selected sulfonated chelating agent and the selected additional sulfonated chelating agent.

20. The method of claim 18 wherein the sulfonated chelating agent is 8-hydroxy-7-iodo-5-quinolinesulfonic acid.

* * * * *

UNITED STATES PATENT AND TRADEMARK OFFICE
CERTIFICATE OF CORRECTION

PATENT NO.        : 8,974,049 B2                        Page 1 of 1
APPLICATION NO.   : 13/754583
DATED             : March 10, 2015
INVENTOR(S)       : Keshava A. Prasad et al.

It is certified that error appears in the above-identified patent and that said Letters Patent is hereby corrected as shown below:

In the Claims

In column 10, line 43 approx., in Claim 6, delete "pyrrollidinone" and insert -- pyrrolidinone --, therefor.

In column 10, line 43 approx., in Claim 6, delete "pyrrollidinone" and insert -- pyrrolidinone --, therefor.

In column 11, line 36 approx., in Claim 15, delete "fixer composition" and insert -- cartridge --, therefor.

Signed and Sealed this
Twenty-fifth Day of August, 2015

Michelle K. Lee
*Director of the United States Patent and Trademark Office*